United States Patent [19]
Menke

[11] Patent Number: 5,926,802
[45] Date of Patent: Jul. 20, 1999

[54] METHOD FOR MULTIPLE USE OF A RULE BASE IN A FUZZY LOGIC COPROCESSOR

[75] Inventor: Manfred Menke, Munich, Germany

[73] Assignee: Siemens Aktiengesellschaft, Munich, Germany

[21] Appl. No.: 08/681,667

[22] Filed: Jul. 29, 1996

Related U.S. Application Data

[30] Foreign Application Priority Data

Jul. 28, 1995 [DE] Germany ............................ 195 27 818

[51] Int. Cl.⁶ ...................................................... G06G 7/00
[52] U.S. Cl. ..................................... 706/4; 395/3; 395/51; 706/8
[58] Field of Search ..................................... 395/61 F, 61, 395/3, 51; 706/3

[56] References Cited

U.S. PATENT DOCUMENTS

| | | | |
|---|---|---|---|
| 5,140,669 | 8/1992 | Zhang | 395/3 |
| 5,299,283 | 3/1994 | Hamamoto | 395/3 |
| 5,313,560 | 5/1994 | Maruoka | 395/54 |
| 5,371,832 | 12/1994 | Eichfeld | 395/3 |
| 5,422,979 | 6/1995 | Eichfeld | 395/3 |
| 5,430,642 | 7/1995 | Nakajima | 364/148 |
| 5,485,550 | 1/1996 | Dalton | 395/51 |
| 5,515,476 | 5/1996 | Nishidai | 395/3 |
| 5,524,174 | 6/1996 | Eichfeld | 395/3 |
| 5,574,826 | 11/1996 | Russo | 395/3 |
| 5,621,860 | 4/1997 | Russo | 395/3 |
| 5,704,010 | 12/1997 | Kunemund | 395/3 |
| 5,719,999 | 2/1998 | Nishidai | 395/3 |
| 5,727,126 | 3/1998 | Eichfeld | 395/3 |
| 5,732,191 | 3/1998 | Kunemund | 395/3 |
| 5,764,855 | 6/1998 | Kunemund | 395/3 |
| 5,778,149 | 7/1998 | Eichfeld | 395/3 |

FOREIGN PATENT DOCUMENTS

| | | | |
|---|---|---|---|
| 0 513 829 A2 | 11/1992 | European Pat. Off. | G06F 9/44 |
| 42 25 758 | 2/1994 | Germany . | |
| 95/08796 | 3/1995 | WIPO . | |

OTHER PUBLICATIONS

Park, Young–Mood, A Self Organizing Fuzzy Logic Controller for Dynamic Systems Using a Fuzzy Auto–Regressive Moving Average (FARMA) Model, IEEE Transactions of Fuzzy Systems, vol. 3 No. 1, Feb. 1995.

Rao, D.H. and Saraf, SS, Study of defuzzification Methods of Fuzzy Logic Controller for Speed Control of a DC Motor, Proceedings of Internation Conferenct on Poser Electronics, Drives and Energy Systems for Industrial Growth, Jan. 1996.

Saade, Jean J., A Unifying Approach to Defuzzyfication and Comparison of the Outputs of Fuzzy Controllers, Aug. 1996.

Bologmani, S. and Zigliotto, M., Hardware and Software Effective Configurations for Multi–Input Fuzzy Logic Controllers, IEEE, 1995.

Chang, Bao R., An Advanced Updating Increment to Speed [Up the Measurement of AC Skin Impedance Based on a Fuzzy Inference Approach, Proceedings on Industrial Automatioin and Control Emerging Technology Applications, May 1995.

Xinqing, Liang, Tsoukalas, Lefteri H., and Uhrig, Robert, A Neurofuzzy Approach for the Anticipatory Control of Complex Systems, IEEE, Mar. 1996.

Chieuh, Tzi–cker, Optimization of Fuzzy Logic Inference Architecture, Computer vol. 25 Issue 5 pp. 67 71, May 1992.

(List continued on next page.)

*Primary Examiner*—Allen R. MacDonald
*Assistant Examiner*—Jagdish Patel
*Attorney, Agent, or Firm*—Hill & Simpson

[57] ABSTRACT

A method is provided in which several rules having an identical conditional part and different consequence parts are processed more quickly in that the fuzzification and at least parts of the inference formation are carried out only once, and in which the storage capacity of a knowledge base memory can be reduced, since all identical conditional parts need be stored only once.

7 Claims, 3 Drawing Sheets

OTHER PUBLICATIONS

Eichfeld, Herbert;Lohner, Michael;Muller, Michael, Architecure of a CMOS Fuzzy Logic Controller with optimized memory organisation and operator design, IEEE, Aug. 3, 1992.

Lafore, Robert, Assembly Language Primer for the IBM PC & XT, pp. 362–63+, 1984.

Ikeda, H.;Kisu, N.; Hiramoto, H.;Nakamura, S, A Fuzzy Inference Coprocessor Using Flexible Active Rule Drive Architecture pp. 537–544, Feb. 1992.

Dodes, Irving Allen, IBM 1620 Programming,pp.103–104, 110–111, 251–253, 1982.

Greenfield, Joseph D. and Wray, William C., Using Microporcessors and Microcomputers: the 6800 Family, p.222, 1982.

Davis, William S., Fortran Getting Started, p.34, 1982.

Zhang et al., "Mit Fuzzy: hohe Regelgeschwindigkeit", TR Transfer, Nr. 47,48—1993, pp. 30–32.

METHOD FOR MULTIPLE USE OF A RULE BASE IN A FUZZY LOGIC COPROCESSOR

BACKGROUND OF THE INVENTION

1. Field of the Invention

The present invention relates generally to a method for using a rule base in a fuzzy logic controller.

2. Description of the Related Art

Fuzzy control, which uses fuzzy logic, is being used more and more in control-oriented processes. In addition to the software solutions using fuzzy logic, there are today also hardware solutions which are very general in their application and are intended for the most rapid and time-critical processes. In addition, these hardware solutions, which are in the form of microelectronic devices, should be small and use little power. The processing speed for the calculation of a sharp output value is thereby determined by the fuzzification, inference and defuzzification steps. A rule base is in general so constructed that several sharp output values are to be calculated thereby. The rules often deviate only minimally from one output to another.

From the German published patent application DE 42 25 758 A1, a circuit arrangement is known having a host computing unit, a fuzzy logic compressor and a knowledge base memory, in which at least one set of rules of a programmable number of rules, and in addition to a memory for a programmable number of input variables can be stored in the knowledge base memory. In this instance, it is disadvantageous that despite the similar construction of the corresponding rule base parts for the respective output variables, they each require rules of their own, and it is not possible to gain subsequent access to calculations that have already been carried out in the fuzzification and inference formation steps of one or more of the preceding rules having the same conditional part.

For the improving the processing speed, a method for accelerated rule evaluation in a fuzzy interface processor is known from the PCT patent application WO 95/08796, in which the conditions of the rules are checked one after the other for each input variable to determine whether the rules are fulfilled or not, and in which for a respective input variable only the conditions of those rules whose conditions were fulfilled for the preceding input variables are checked.

SUMMARY OF THE INVENTION

The underlying aim of the present invention is to increase the processing speed per emitted sharp output value and to reduce the memory space needed for the rule base over the prior art. This and other advantages of the invention are provided by a method for multiple use of a rule base in a fuzzy logic coprocessor in which a parameter word, as well as start addresses for input matching functions, a conditional part, a rule base and output matching functions are stored, and in which the overall conditional part of all rules of a rule base and an overall consequence part of the rule base are stored directly after one another in separate blocks, and in which further overall consequence parts of the rule base having the same overall conditional part are stored together with a respective further parameter word and a respective further start address for further output matching functions, one directly after the other, whereby an allocation between the overall conditional part and the overall consequence part, as well as the overall further consequence parts, exists only through the memory sequence, and in which rule weights are formed for all rules from sharp input values by means of input matching functions and of a conditional part, whereby the respective defuzzification method to be used is determined by the respective parameter word.

In particular, the advantages of the invention are that an overall consequence part of a rule base can be flexibly exchanged, or that several overall consequence parts of a rule base are easily addressable, and the processing speed can be drastically reduced per emitted output value, since the fuzzification and at least parts of the inference formation do not have to be carried out anew for the different consequence parts.

In the foregoing method, a maximum number of overall consequence parts is stored, in which a counter for the already processed consequence parts is incremented after the formation of a respective sharp output value, and in which the formation of the sharp output values is terminated as soon as the counter reaches the maximum number of processed overall consequence parts.

A respective marking bit is provided in the respective parameter value, and after the formation of a respective sharp output value it is respectively checked whether a last overall consequence part is marked as such by the last marking bit, and the processing is thereupon broken off.

In the method, further rule bases consist only of a part of the rule base, and only a part of the rule weights, which are calculated once, of the rule base is used for the formation of the further sharp output values.

All overall consequence parts are equal, and the aggregated rule weights are formed only once, and during the formation of the further sharp output values only respectively different output matching functions and/or different defuzzification methods are applied.

The method according to one of the preceding is improved, in which one sharp output value is formed and emitted for the controlling of a process, and the further sharp output values are formed and emitted for purposes of monitoring.

BRIEF DESCRIPTION OF THE DRAWINGS

The invention is described more precisely below on the basis of the drawings as follows.

DETAILED DESCRIPTION OF THE PREFERRED EMBODIMENTS

Figure 1:
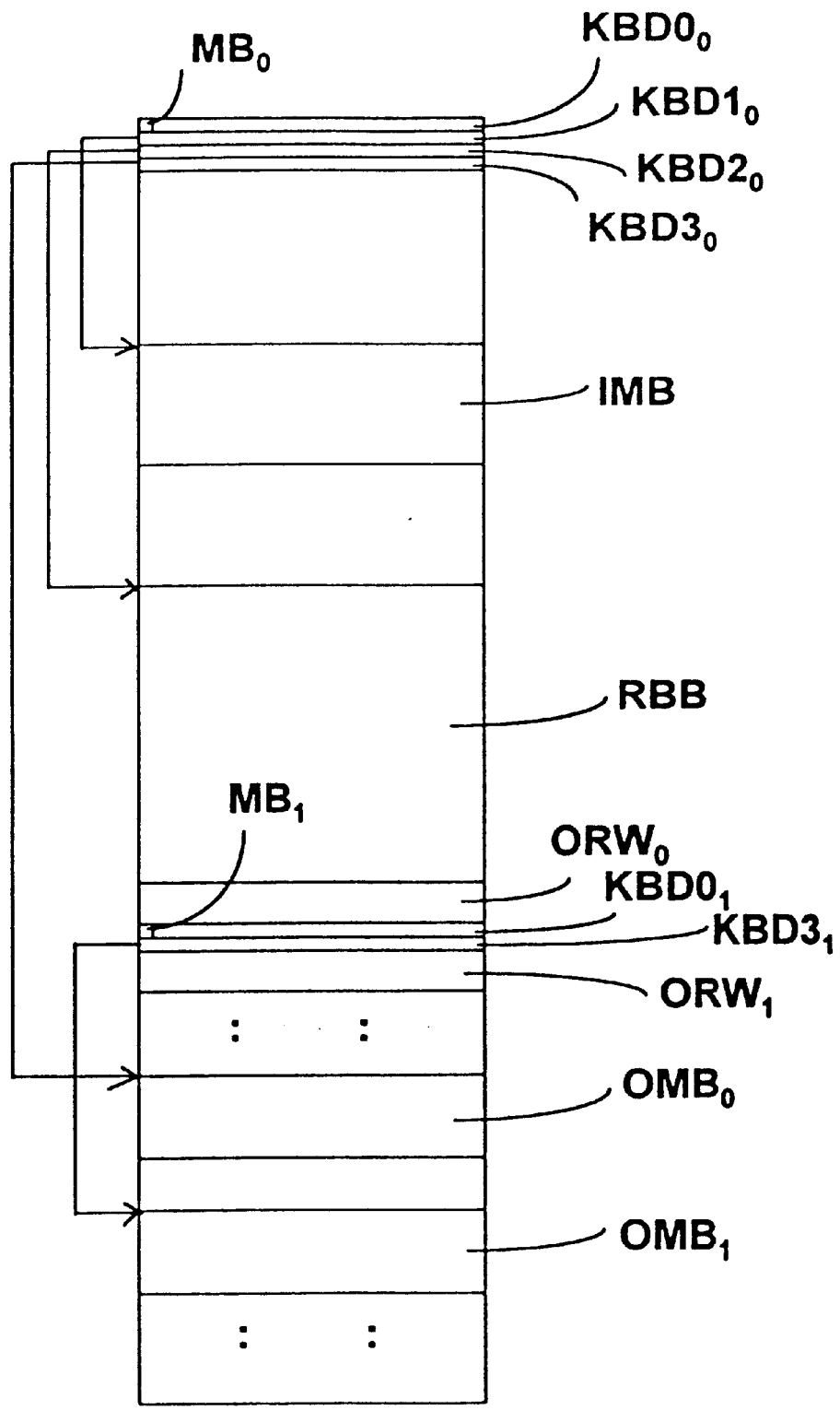
FIG. 1 is a schematic diagram showing an occupation of a knowledge base memory required for the inventive method.

FIG. 1 shows a knowledge base memory whose memory words having the lowest addresses are knowledge base descriptor words $KBD0_0 \ldots KBD3_0$, where the descriptor word $KBD0_0$ has a parameter word, the descriptor word $KBD1_0$ has a start address for an input matching functional block IMB, the second knowledge base descriptor word $KBD2_0$ has a start address of a rule base block RBB containing the conditional part of the rule base, and a third knowledge base descriptor word $KBD3_0$ has a start address for a first output functional block $OMB_0$. By means of the start addresses, the input matching functional block IMB, the rule base block RBB and the first output matching functional block $OMB_0$ can thus be provided practically at arbitrary locations in the knowledge base memory. A first consequence part $ORW_0$ of the rule base is immediately subsequent to the rule base block RBB and thus does not require its own start address. A further parameter word $KBD0_1$ and a further start address $KDB3_1$, as well as a further consequence part $ORW_1$, are appended immediately to the end of the consequence part $ORW_0$, one after the other. The further knowledge base descriptor $KBD3_1$ contains the start address for a further output matching functional block $OMB_1$, which again can be stored practically at an arbitrary location in the knowledge base memory.

If additional consequence parts are required, a storing operation ensues, corresponding, as is the case for the further descriptors $KBD0_1$ and $KBD3_1$, to the consequence part $ORW_1$ and to the output matching functional block $OMB_1$, whereby the respective descriptors and the respective consequence part are immediately annexed one after the other to the end of the preceding consequence part, and all further output matching functional blocks can again stand at an arbitrary location in the knowledge base memory.

The allocation between the common conditional part of the rule base and the consequence parts of the rule base ensues solely through the relative position in the knowledge base memory.

The parameter word $KBD0_0$ can include a marking bit $MB_0$, and the descriptor word $KBD0_1$ can include a marking bit $MB_1$. The same holds for further parameter words.

Figure 2:
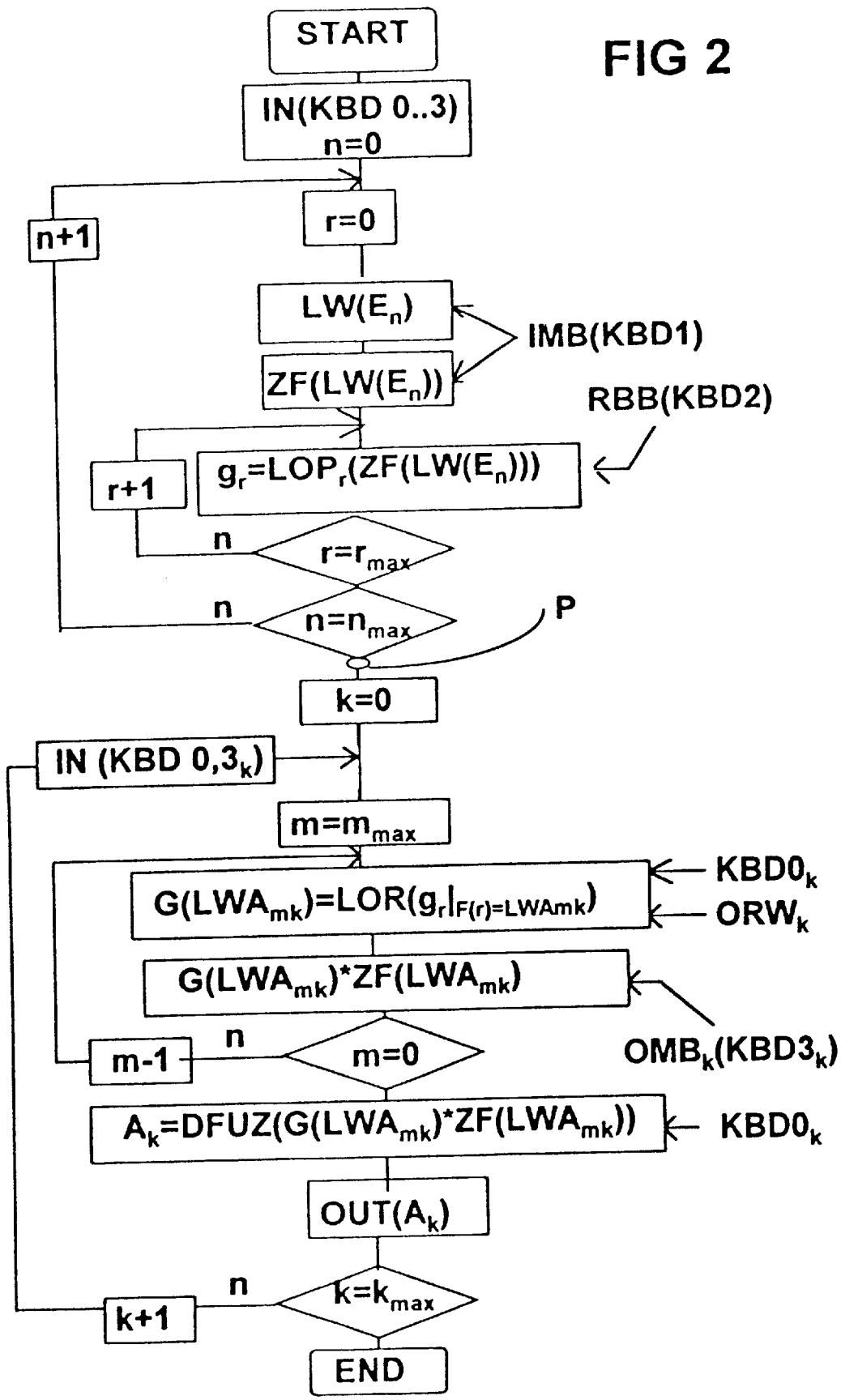
FIG. 2 is a flow diagram for the explanation of the inventive method.

FIG. 2 shows a simplified flow diagram of the present method, whereby the required memory handles or accesses are indicated at the right, next to the actual flow diagram.

After the beginning of the method as indicated by the label START, the knowledge base descriptors $KBD0 \ldots 3_0$ are read in for the first rule base. Furthermore, a number n of the input variables $E_n$ is set to zero at the beginning. After this, the respective rules, the relevant linguistic values $LW(E_n)$ of the respective input variables and corresponding matching functional values $ZF(LW(E_n))$ are formed in a loop for all $n_{max}$ input variables by means of memory accesses to the input matching functional block IMB (KBD1), whose start address is stored in the descriptor word KBD1. Further, a rule number r=0 is first set. After this, for all $r_{max}$ rules the corresponding values of the matching functions $ZF(LW(E_n))$ are respectively connected with a linguistic operator for a rule having a rule number r. The linguistic operator LOP consists, for example, of a linguistic AND operation. A linguistic AND operation can thereby for example be effected by the formation of a minimum. A rule weight $g_r$ is formed for each rule by the linguistic operator $LOP_r(ZF(LW(E_n)))$, whereby the type of linguistic operator is coded in the rules r and whereby the conditions of the input variables from the rule base block RBB that are involved in a rule are stored, whose start address is stored in the descriptor word KBD2. The formation of the rule weights gr thereby ensues in a corresponding way for all $r_{max}$ rules. At a time P, rule weights $g_r$ are thus determined for all $r_{max}$. All sharp output values $A_k$ are thereupon formed for k=0 . . . $k_{max}$, whereby the rule weights $g_r$, which are calculated only once, are used for all outputs $A_k$. Advantageously beginning with the largest number $m_{max}$ of the output matching functions, all rule weights $g_r$ of rules having the same linguistic value of the respective consequence part are linguistically OR-combined into aggregated rule weights $G(LWA_{mk})$, whereby the type of the linguistic OR connection is determined by means of the respective knowledge base descriptor $KBD0_k$ and the respective consequence part $ORW_k$. The matching functions $ZF(LWA_{mk})$ of the linguistic values of the output variables $LWA_{mk}$ of the respective consequence part are weighted with the associated aggregated rule weights $G(LWA_{mk})$, whereby the matching functions are read out from the respective output matching functional block $OMB_k$, whose respective start address is determined by the respective knowledge base descriptor $KBD3_k$. The respective sharp output value $A_k$ is formed by defuzzification of the matching functions $ZF(LWA_{mk})$ weighted by the aggregated rule weights, whereby the respective defuzzification method is determined by the respective knowledge base descriptor $KBD0_k$. After the formation of the respective sharp output value $A_k$, this is outputted, and new knowledge base descriptors are loaded, until all sharp output values $A_k$ are formed with k=0 . . . $k_{max}$ and an end step END is reached.

Whether all sharp output values $A_k$ were formed can ensue, as shown in FIG. 2, through incrementing of a counter for k and an inquiry for the output of the respective value $A_k$, to determine whether the value for k has already reached the value $k_{max}$.

Figure 3:
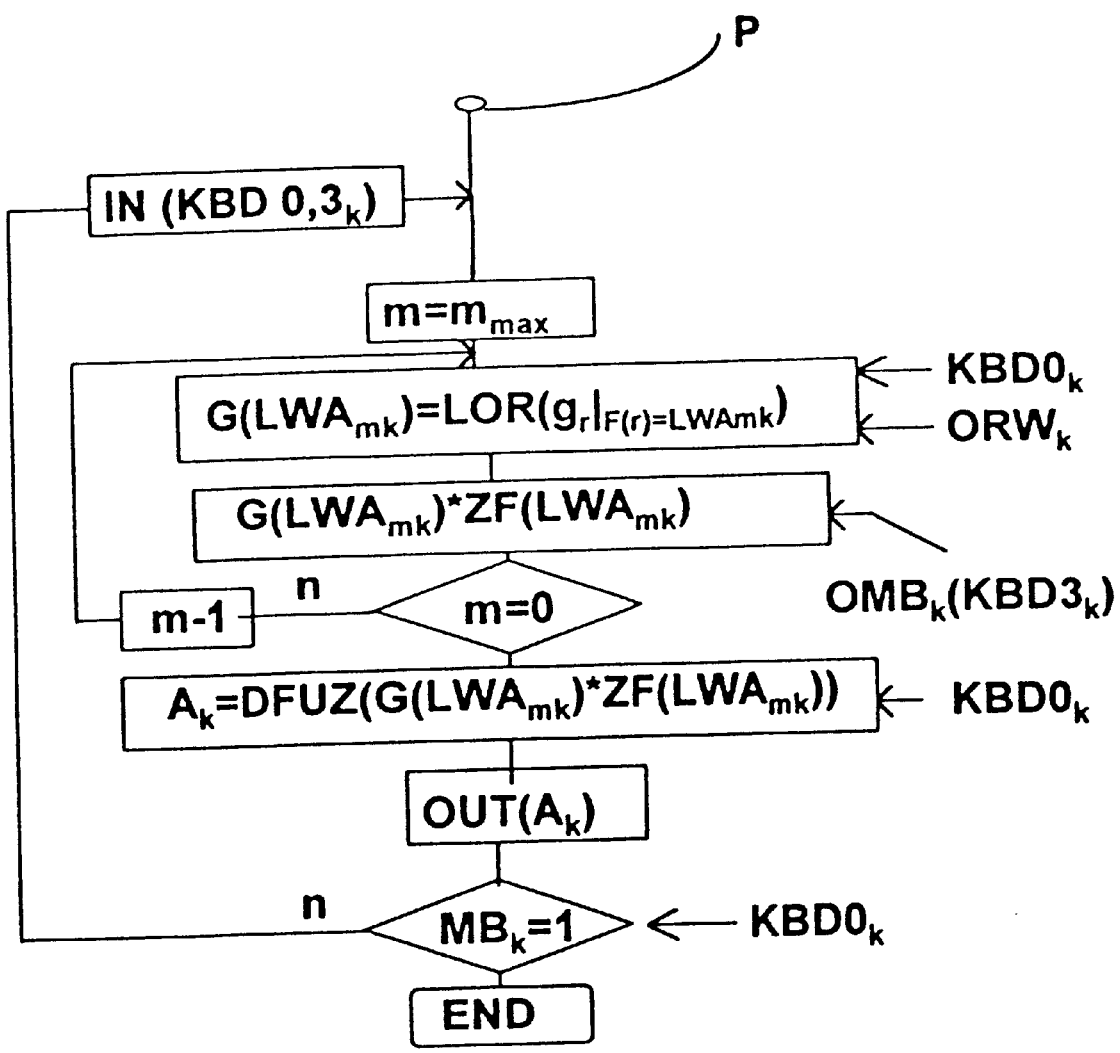
FIG. 3 is an alternative for a part of the flow diagram of FIG. 2.

On the other hand, this can be achieved, as shown in FIG. 3, by a respective marking bit $Mb_k$ being provided in all first knowledge base descriptors $KDD0_k$, i.e. in the parameter words, which bit is set e.g. with $k=k_{max}$ for the last knowledge base descriptor $KBD0_k$, and which bit is respectively checked according to the output $OUT(A_k)$ of the respective sharp output value $A_k$, whereby this development represents a further improvement in speed in relation to the first development.

Another development of the present method consists, for example, of only a part of the rule base being used for further consequence parts; thus, only a part of the rule weights $g_r$, which are calculated once, is used for the formation of the further sharp output values.

For the case in which all the consequence parts $ORW_k$ are equal, and the aggregated rule weights $G(LWA_{mk})$ thus need to be calculated only once, a simplified development of the present method consists in that during the formation of the further sharp output values $A_k$ only respectively different output matching functions $OMB_k$ and/or different defuzzification methods are applied, and in that the aggregated rule weights are formed only once.

This method can preferably be used for the purpose that one sharp output value is formed and emitted for the controlling of a process, and the further sharp output values are formed and emitted for purposes of monitoring.

Although other modifications and changes may be suggested by those skilled in the art, it is the intention of the inventor to embody within the patent warranted hereon all changes and modifications as reasonably and properly come within the scope of his contribution to the art.

I claim:

1. A method for multiple use of a rule base in a fuzzy logic coprocessor, comprising the steps of:
    storing a parameter word and start addresses, said start addressing including:
        a start address for input matching functions,
        a start address for a conditional part,
        a start address for a rule base, and
        a start address for output matching functions,
    storing an overall conditional part of all rules of the rule base and an overall consequence part of the rule base directly after one another in separate blocks,
    storing further overall consequence parts of the rule base having the same overall conditional part together with a respective further parameter word and a respective further start address for further output matching functions, said further overall consequence parts being stored in memory one directly after the other, an allocation between the overall conditional part and the overall consequence part and the overall further consequence parts existing only through a memory sequence, forming rule weights for all rules from sharp input values by input matching functions and a conditional part of the rule base, combining the rule weights into a respective aggregated rule weight in dependence on the respective consequence part and on the respective parameter word for each linguistic value of the respective output variables according to a respective aggregation method determined by the respective parameter word, said rule weights having been formed once, weighting the respective output matching functions with the respective aggregated rule weights, and defuzzifying the output matching functions into a respective sharp output value, the respective defuzzification method to be used being determined by the respective parameter word.

2. A method as claimed in claim 1, further comprising the steps of:

storing a maximum number of overall consequence parts, incrementing a counter for already processed consequence parts after formation of a respective sharp output value, and terminating formation of the sharp output values as soon as the counter reaches a maximum number of processed overall consequence parts.

3. A method as claimed in claim 1, further comprising the steps of:

providing a respective marking bit in the respective parameter value, and after the formation of a respective sharp output value, checking whether a last overall consequence part is marked as such by the last marking bit, and thereupon halting processing.

4. A method as claimed in claim 1, wherein further rule bases are only of a part of the rule base, and further comprising the step of:

using only a part of the rule weights which are calculated once, of the rule base for formation of the further sharp output values.

5. A method as claimed in claim 1, wherein all overall consequence parts are equal, and further comprising the steps of:

forming the aggregated rule weights only once, and during the formation of the further sharp output values, applying only respectively different output matching functions and/or different defuzzification methods.

6. A method as claimed in claim 1, wherein one sharp output value is formed and emitted for controlling of a process, and further sharp output values are formed and emitted for purposes of monitoring.

7. A method as claimed in claim 1, wherein said step of storing start addresses stores each of said start addresses in a corresponding single memory location.

* * * * *